Feb. 13, 1962  E. J. H. FIALA ETAL  3,021,172
SELF-SUPPORTING VEHICLE BODY
Filed July 3, 1958  3 Sheets-Sheet 1
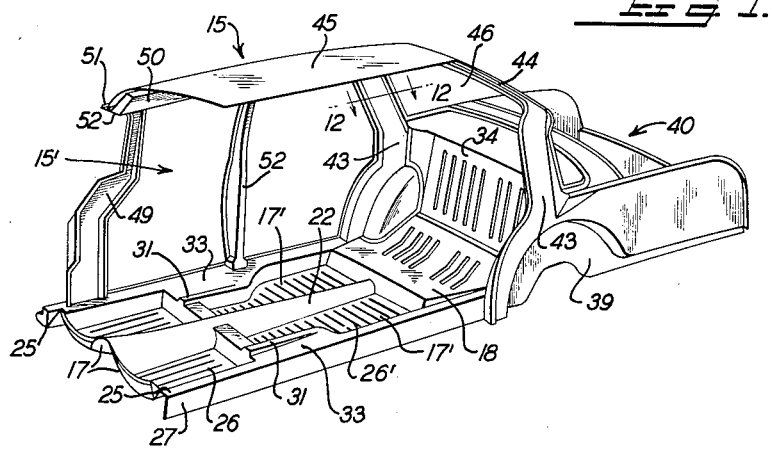
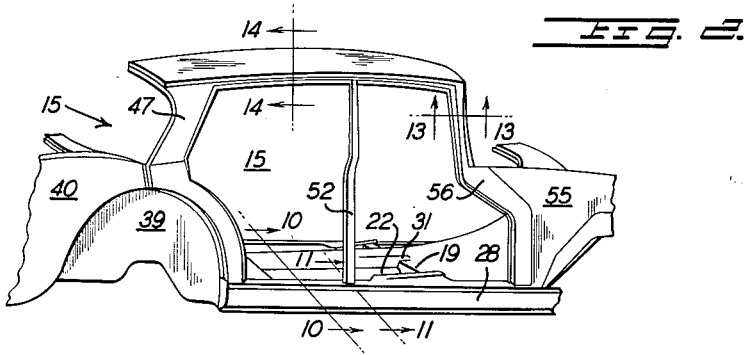
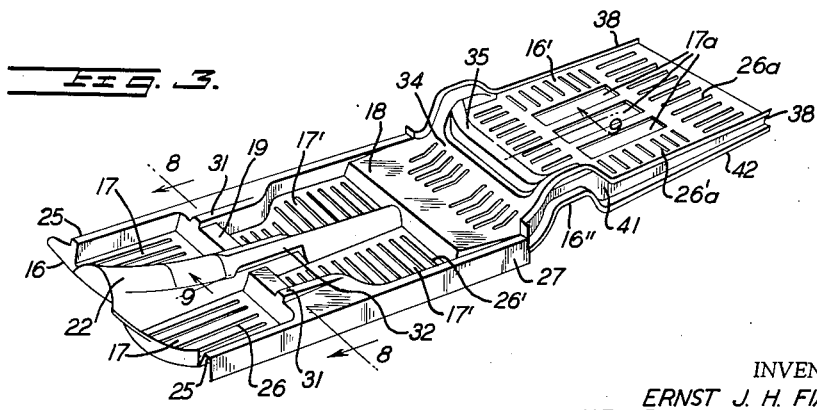
INVENTORS.
ERNST J. H. FIALA
HEINRICH HASELMANN
BY Dicke and Craig
ATTORNEYS Feb. 13, 1962   E. J. H. FIALA ETAL   3,021,172
SELF-SUPPORTING VEHICLE BODY
Filed July 3, 1958   3 Sheets-Sheet 2
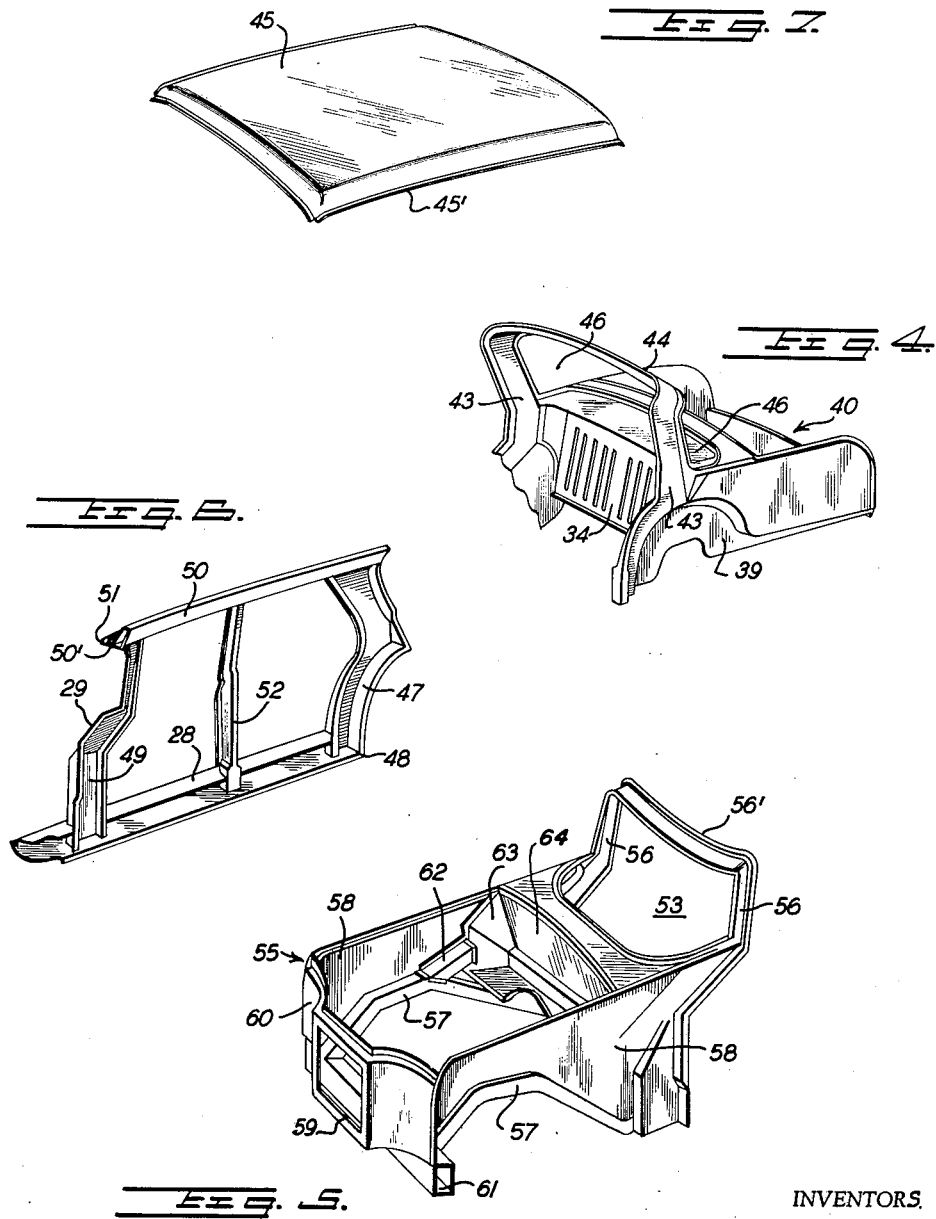
INVENTORS,
ERNST J. H. FIALA
HEINRICH HASELMANN
BY Dicke and Craig
ATTORNEYS

INVENTORS.
ERNST J. H. FIALA
HEINRICH HASELMANN

BY *Dicke and Craig*

ATTORNEYS 3,021,172
SELF-SUPPORTING VEHICLE BODY
Ernst J. H. Fiala and Heinrich Haselmann, Sindelfingen, Kreis Boeblingen, Germany, assignors to Daimler-Benz Aktiengesellschaft, Stuttgart-Unterturkheim, Germany
Filed July 3, 1958, Ser. No. 746,522
Claims priority, application Germany July 5, 1957
18 Claims. (Cl. 296—28)

The present invention relates to further improvements in the construction of self-supporting vehicle bodies made of subassembled pressed sheet-metal parts in which the self-supporting vehicle body is composed of a floor part, of a front part, of a rear part, of two lateral or side wall parts and of a roof part.

These types of known self-supporting vehicle bodies have the advantage that they form a self-supporting unit which is relatively resistant against twisting and torsional stresses. Furthermore, this type of self-supporting vehicle body construction is relatively simple and inexpensive to manufacture because the individual parts thereof are relatively easy to press or shape by suitable pressing or stamping operations. This is particularly the case if these parts of the self-supporting vehicle body completely enclose the door and window apertures because in that case the use of special separate corner connecting parts is obviated whereby assembly is also facilitated thereby.

The present invention aims at improving still further the resistance to torsion and twisting of this type of vehicle body and to reduce the cost of manufacture thereof, and more particularly by certain measures and expediencies which are made at certain places of the vehicle body in predetermined combination in such a manner that at all connecting places of the individual structural subassembly parts, during assembly thereof, box-shaped bearer like hollow profile members closed upon themselves will be produced which in their entirety form a frame-like structure reinforcing the vehicle body which, however, is not apparent at all to an outside observer.

Accordingly, the present invention consists in that the floor part consists of a floor plate reinforced, in a manner known per se in the prior art, by means of suitable stampings, the longitudinal edge or rim portions of which are angularly bent, in a manner known per se in the prior art, in the forward region and/or in the center region of the door apertures of the vehicle into flat flange portions, particularly into parallel flat flange portions, whereas the longitudinal rim or edge portions in the rearward region of the floor plate are formed, from an ininterrupted raised portion above the wheel guiding system, into an outwardly open U-shaped profile or cross sectional configuration which are completed thereat by the outer wall portions, in particular of flat configuration, of a rear part emplaced thereon into closed box-like bearer members, while sill members of known construction provided at the lateral side wall parts, which enclose the door apertures form in turn with the inwardly open U-shaped cross section thereof, together with the aforementioned forward lateral flange portions of the floor plate, closed box-shaped longitudinal bearer members, and in that the contact rim or connecting edge portions which extend essentially in the vertical direction are constructed and shaped at the rear part and at the front part of the body and at the edge portions of the lateral wall parts facing the same in such a manner that upon assembly of the vehicle body they mutually complete each other into box-like hollow profile members.

According to a further feature of the present invention, with the use of a rigid firmly-emplaced roof, the rim portions defining the roof aperture of adjacent body parts are also made of such profile or configuration that together with the roof they form a closed box-shaped bearer-like hollow rim portion.

Accordingly, it is an object of the present invention to provide a self-supporting vehicle body, particularly for motor vehicles, which is simple in construction, inexpensive to manufacture and which facilitates assembly thereof.

Another object of the present invention is the provision of a self-supporting vehicle body which offers particularly high resistance to twisting, torsion as well as other deformations to which the body may be subjected.

Still another object of the present invention is the provision of a vehicle body in which all connecting places between adjacent body parts, particularly between subassemblies thereof, are so shaped and constructed as to form hollow members of box-like shape, bearer-like characteristics, which taken together reinforce the vehicle body without producing any conspicuous outward appearances of such reinforcement.

A further object of the present invention is the provision of a self-supporting vehicle body made of several parts which facilitates assembly thereof by the provision of appropriate connecting flange or edge portions between adjacent mutually facing complementary parts which are so shaped and constructed as to form reinforcing members.

These and other objects, features and advantages of the present invention will become more obvious from the following description when taken in connection with the accompanying drawing, which shows, for purposes of illustration only, one embodiment in accordance with the present invention, and wherein:

FIGURE 1 is a perspective view, with certain parts omitted, of the rear and center parts of the vehicle having and a self-supporting vehicle body in accordance with the present invention, as seen from in front and the left side of the vehicle, the left side of the vehicle being omitted for purposes of showing more clearly the inner edge portions of the adjacent vehicle parts;

FIGURE 2 is a side view as seen from the opposite side of FIGURE 1, i.e., from the right side of the vehicle, of a self-supporting body in accordance with the present invention;

FIGURE 3 is a perspective view of the floor part of a self-supporting body in accordance with the present invention;

FIGURE 4 is a perspective view of the rear part of a self-supporting vehicle in accordance with the present invention;

FIGURE 5 is a perspective view of the front part of a self-supporting vehicle body in accordance with the present invention;

FIGURE 6 is a perspective view of a lateral or side wall part of a self-supporting vehicle body in accordance with the present invention as seen from the inside thereof;

FIGURE 7 is a perspective view of the proof part of a self-supporting vehicle body in accordance with the present invention;

Figure 13:
Figure 14:
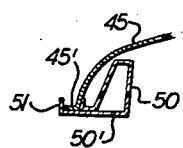

FIGURE 13 is a cross-sectional view taken along line 13—13 of FIGURE 2 and showing the cross-section of a hollow box-like supporting member formed by the complementary portions of the vehicle front part and the right side of the lateral body wall portion of a self-supporting body in accordance with the present invention, and FIGURE 14 is a cross-sectional view taken along line 14—14 of FIGURE 2 and showing the cross-sectional construction of the rim portion of a roof in accordance with the present invention.

Referring now to the drawing, wherein like reference numerals are used throughout the various views to designate like parts, and more particularly to FIGURES 1 and 2 thereof, reference numeral 15 generally designates the vehicle body which is composed of six main structural parts or subassemblies and which consists, as mentioned hereinabove, of the floor part, the front part, the rear part, the roof part, and the two side or lateral wall parts, the details of which are also illustrated more fully in FIGURES 3 to 7 of the drawing. These six main parts or subassemblies enclose the passenger space generally designated by reference numeral 15' (FIGURES 1 and 2). Each of these main structural body parts is made or subassembled by itself; in addition to the reinforcements produced by the pressed or stamped shapes or configurations of the various members, a special reinforcement thereof is achieved by making the connections or the connecting portions thereof in a semi- or partial shell-like shape in such a manner that these shapes form during assembly of complementary parts essentially closed hollow bearer members. The term "shell-like" shape is used herein to designate an essentially closed configuration formed by the complementary body parts each of which is of "semi" or "partial shell-like" configuration in cross section.

Figure 8:
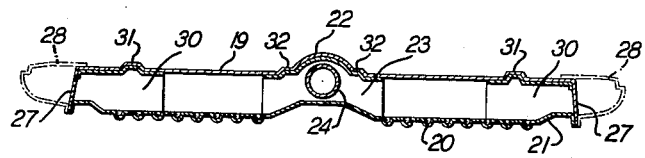
FIGURE 8 is a cross-sectional view taken along line 8—8 of FIGURE 3 and showing certain details of the cross-sectional configuration of the floor part of a self-supporting vehicle body in accordance with the present invention.
Figure 10:
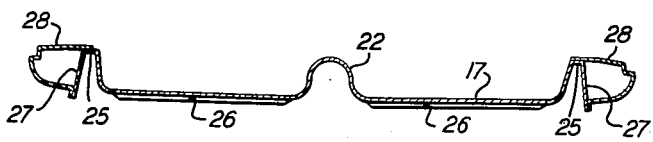
FIGURE 10 is a cross-sectional view taken along line 10—10 of FIGURE 2 and showing a transverse cross section of the floor portion of the vehicle body in accordance with the present invention within the region of a door.

As shown in FIGURE 3, the floor plate 16 is provided with deep-drawn recesses 17 for the foot space in front of the forward seats and with recesses 17' in front of the rear seats, the latter being disposed above the floor plate portion 18. A cross bearer member 19 which is open toward the bottom thereof is disposed between the recesses 17 and 17', the cross bearer member 19 being completed into a closed bearer member by the covering sheet metal plate 21 provided also with longitudinal reinforcing grooves 20. The cross bearer member 19 is further reinforced in the center part thereof by a longitudinal tunnel-shaped member 22 (FIGURES 1, 2, 8 and 10) and by a box-shaped auxiliary cross bearer member 23 (FIGURE 8) in which a tubular member 24 is arranged which accommodates the cardan shaft. The recesses 17 and 17' are additionally reinforced also by longitudinal and cross ribs or grooves 26 and 26' (FIGURES 1 and 3).

Figure 9:
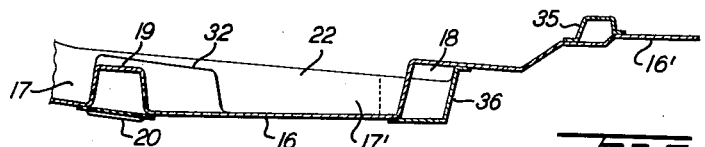
FIGURE 9 is a cross-sectional view taken along line 9—9 of FIGURE 3 and showing certain other details of the longitudinal configuration of the floor part of the self-supporting body in accordance with the present invention.

Rearwardly of the rear seats (not shown) the floor plate 16 rises to a particular rear floor portion 16' (FIGURES 3 and 9) in order to provide the necessary freedom of movement for the wheel-guiding members not shown in the drawing. Furthermore, this rear floor portion 16' is additionally reinforced by means of stamped or pressed recesses 17a and by means of longitudinal ribs 26a and cross ribs 26a'.

From a point within the region of the rising transition portion 18 of the rear section of the floor plate 16 up to the forward end thereof, the longitudinal rim portion of the floor plate 16, proceeding in the direction from the vehicle inside to the outside, is at first inverted at 25 as seen in cross section (FIG. 10) so as to produce on each side of the vehicle an inverted raised edge portion 25 having an essentially horizontal top portion. Outwardly adjoining each top portion is another downwardly extending web portion 27 so that consequently essentially rectilinear U-shaped profile sections are formed which are parallel to each other and open toward the bottoms thereof.

Figure 11:
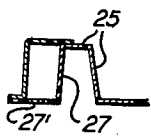
FIGURE 11 is a cross-sectional view taken along line 11—11 of FIGURE 2 and showing the construction of the floor portion of a vehicle body in accordance with the present invention within the region of a door post.

As shown in FIGURE 11, the web portion 27, however, may also be angularly bent to thereby provide an essentially horizontal connecting flange portion 27' so that an essentially hat-shaped rim or edge cross section is produced for purposes of connection with the sill members 28 of the lateral wall parts 29 to be described more fully hereinafter.

For purposes of further reinforcing the cross bearer member 19, separate hollow auxiliary cross bearer members 30 (FIGURE 8) are provided which are connected to and extend inwardly from the web portions 27 whereby the auxiliary cross bearer members 30 extend through the raised edge portions 25 at this place. Furthermore, the cross bearer members 19 and 30 reinforce the connection with the sill members 28 placed thereon and connected thereto.

For purposes of further increasing the rigidity, the floor part 16 is provided, within the region of the outer ends of the cross bearer member 19 at the height of the raised portion 25 thereof with a widened portion 33 (FIGURE 1) which extends rearwardly up to a point in front of the rear seats a given distance, approximately up to the center of the recess 17' in the longitudinal direction thereof. The enlarged or widened portions 33 are limited on the inner side thereof by rail-like abutment surfaces 31 (FIGURES 1, 2, 3 and 8) projecting above the upper surface thereof to which correspond similarly shaped stamped or pressed-out surfaces 32 at the tunnel-shaped member 22. These surfaces 31 and 32 serve as abutment or support surfaces for the seats.

The rear floor portion 16' either consists of a single piece unitary with the forward floor portion 16 or the former is made separately from the latter and suitably connected thereto. In either case, a separate cross bearer member 35 (FIGURES 3 and 9) is provided for the rear seats at the place of transition rearwardly of the support surface 18. Furthermore, a profile member 36 of essentially S-shaped cross section (FIGURE 9) is secured within the region of the rear seat support 18 for purposes of reinforcement and for closing the lateral rim portions 25 open thereat toward the bottom; the profile member 36 avoids the longitudinal tunnel 22 by means of a central bent-up or off-set portion not visible in the different views of the drawing.

The lateral rim portions of the floor section 16' are provided with rear flange portions 38 (FIGURE 3) bent upwardly which are welded later on to the downwardly smooth or flat inner sheet-metals 39 of the wheel housings (FIGURES 1 and 4) provided at the body rear part generally designated by reference numeral 40 (FIGURE 4). Reinforcing rail members 41 which are secured from below and which are angularly bent several times in the vertical direction are provided along the lateral rim portions of the floor plate portion 16' below these flange portions 38; the lower flange portions 42 of the reinforcing rail members 41 (FIGURE 3) form, together with the flange portions 38 of the rear floor portion 16' and with the inner sheet-metal surfaces 39 of the wheel housings, rearwardly disposed hollow bearer members which, as mentioned already hereinabove, are bent upwardly within the region of the vehicle rear axle as shown in FIGURE 3 where the bent-up portion is designated by reference numeral 16".

One bearer member 43 each (FIGURE 4) extending essentially vertically and of essentially semi-shell-shaped cross section, which form part of the rear columns of the vehicle body, rises above the rear wheel housings on each side of the vehicle, the connecting rim or edge portions 44 of which, disposed essentially at the height of the roof, simultaneously define or delimit the rear aperture for the accommodation of the roof 45 (FIGURE 7). Furthermore, this bearer member 43 also encloses the aperture 46 (FIGURE 4) for the rear window. The rear body part 40 is further closed off below the aperture 46 by a cross wall 34 provided with suitable reinforcing ribs.

Figure 12:
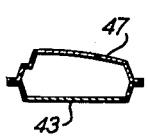
FIGURE 12 is a cross-sectional view taken along line 12—12 of FIGURE 1 and showing the cross-sectional configuration of a hollow box-like support member formed by the complementary portions of the rear part and the right side of the lateral wall part of the vehicle body.

During assembly, the semi-shell-like bearer members 43 (FIGURES 1 and 4) form, together with side parts 47, disposed closest thereto, of the lateral wall parts generally designated by reference numeral 29 (FIGURE 6), hollow closed box-like bearer members (FIGURE 12) of which the lower ends, for example, at 48 in FIGURE 6, are rigidly connected with the longitudinal bearer members formed by the sill members 28 and the rim or edge profile sections 25 and 27 of the floor part 16 which bearer members 49 extend up to a hollow profile section 50 (FIGURES 6 and 14) forming a roof frame. The lower closure portion 50' (FIGURE 14) of this hollow profile section 50 is widened or enlarged toward the outside thereof and the outer rim of this widened portion is bent upwardly. The channel 51 resulting therefrom serves as abutment for the roof 45 which is also provided with a reinforcing rim portion 45' (FIGURES 7 and 14). The lateral wall parts 29 of the body are constructed to be particularly rigid or sturdy against thrusts or other forces by the provision of centrally disposed door posts 52 also formed as hollow box-like bearer members. The forward bearer members 49 of the lateral wall parts 29 are directly connected with the front part of the vehicle body generally designated by reference numeral 55 (FIGURE 5). As described, the side parts 47 and forward bearer members 49 of lateral wall parts 29 constitute end or outer bearer members thereof and door posts 52 constitute intermediate or inner bearer members.

The front part generally designated by reference numeral 55 (FIGURE 5) of the self-supporting vehicle body in accordance with the present invention includes an aperture 53 for the windshield of the vehicle. The connecting profile sections or bearer members 56 of this part are also so constructed that they are completed into a hollow box-like cross section with the semi-shell-shaped profile sections 49 of the lateral wall parts 29 (FIGURE 13). The upper section 56' of the frame surrounding the windshield also defines or delimits, similarly as the rear part 40, the forward rim or edge of the aperture accommodating the roof frame 50. The side walls of the front part 55 are kept essentially flat, and the engine space disposed therebetween is closed off by a front wall 60. The front wall 60 is provided with a central aperture 59 for the admission of air or for the installation of a radiator or engine cooler. A forward cross bearer member 61 is disposed below the closure wall 60, while two upwardly-bent longitudinal bearer profile sections 57 are connected to and adjoin the cross bearer member 61. The longitudinal bearer members 57 are braced within the engine space by inclined strut members 62 which again abut against the profile member 63 at the forward wall 64 which may constitute a fire wall.

The floor section 16 of the passenger space and the rear floor section 16' thereof may also be composed of four recess-shaped individual parts, possibly also in such a manner that the separating joints are disposed, for example, in the center of the longitudinal tunnel member 22 and in the center of the cross bearer member 19, thereby facilitating assembly.

The vehicle body construction described hereinabove is equally suitable for vehicles with panoramic windshields and windows as well as for those having a windshield or window arrangement as used heretofore. The forward door columns or posts 29, 56 may also extend over the entire length thereof with a forward inclination, if this is desirable for reasons of rigidity or for any other reasons.

In addition to the advantages mentioned hereinabove, the construction in accordance with the present invention offers the further advantage that within the region of the door openings relatively low boarding profiles or entrance cross sections are present. Furthermore, a transition of the floor profile or cross section from the front to the rear parts of the vehicle which is extremely resistant to twisting and particularly appropriate for supporting thereon the weight results from the use of a construction in accordance with the present invention.

While I have shown and described one preferred embodiment in accordance with the present invention, it is understood that the same is not limited thereto but is susceptible of many changes and modifications within the scope and spirit of the present invention, and I, therefore, intend to cover all such changes and modifications as are encompassed by the scope of the appended claims.

I claim:
1. A self-supporting vehicle body composed of a plurality of main body parts made of pressed sheet-metal members comprising a floor plate part, a roof part, a front part, a rear part and two lateral wall parts, said floor part including a reinforced floor plate and having in the forward region thereof angularly bent longitudinal rim portions having a downwardly opening U-shaped profile and including substantially vertical web portions, and within the rear region thereof longitudinal rim portions of essentially U-shaped profile opened toward the outside thereof, said rear part including wall surfaces completing the rim portions of said U-shaped profile into a hollow box-like bearer member, said lateral wall parts including sill portions having an inwardly open U-shaped cross section to thereby complete said web portions of said floor part in the forward region into box-like longitudinal bearer members, and said rear and front parts each including upwardly extending portions of semi-shell-like cross section cooperating with upwardly extending complementarily shaped portions of said lateral wall parts to form hollow box-like profile bearer members, said complementarily shaped portions being of semi-shell-like cross section.

2. A self-supporting vehicle body as defined in claim 1, wherein said front and rear parts are connected as subassembled parts to said floor part and to said lateral wall parts.

3. A self-supporting vehicle body as defined in claim 1, wherein some of said main parts include rim means defining an aperture for said roof part, said rim means being of such cross-sectional configuration as to form a profile-shaped bearer-like hollow rim member, said rim member being adapted to support thereon the edge portion of said roof part.

4. A self-supporting vehicle body as defined in claim 3, wherein each of said lateral wall parts includes two end bearer members of essentially semi-shell-shaped cross section and one hollow bearer member of closed cross section intermediate said end bearer members and extending upwardly from one of said sill portions, said three bearer members supporting a longitudinal section of said rim means.

5. A self-supporting vehicle body as defined in claim 4, wherein said hollow rim member is provided with an outwardly extended portion formed into channel shape to receive therein said roof edge portion.

6. A self-supporting vehicle body as defined in claim 5, wherein the rim means of said rear part and of said front part also include similarly shaped outwardly extended portions formed into channel shape.

7. A self-supporting vehicle body as defined in claim 6, wherein said roof edge portion includes reinforcing means.

8. A self-supporting vehicle body composed of a plurality of main body parts made of pressed sheet-metal members comprising a floor plate part, a roof part, a front part, a rear part and two lateral wall parts, said floor part including a reinforced floor plate and having angularly bent longitudinal rim portions of essentially U-shaped profile opening downwardly, said lateral wall parts including sill portions having an inwardly opening U-shaped cross section to thereby complete said longitudinal rim portions of said floor part into box-like longitudinal bearer members, said rear and front parts each including upwardly extending portions of semi-shell-like cross section cooperating with upwardly extending complementarily shaped portions of said lateral wall parts to form hollow box-like profile bearer members, said complementarily shaped portions being of semi-shell-like cross section, said upwardly extending portions of said front part passing over into an interconnecting section essentially at the height of said roof part, and said last-mentioned upwardly extending portions and said interconnecting section forming a frame enclosing at least on three sides thereof the aperture for the windshield.

9. A self-supporting vehicle body as defined in claim 8, wherein said front part further includes two side walls adjoining said two last-mentioned upwardly extending portions and defining laterally the engine compartment, and a front wall enclosing said engine compartment and provided with an air inlet aperture.

10. A self-supporting vehicle body as defined in claim 9, wherein said side walls are essentially flat, and wherein said air inlet aperture is adapted to receive a radiator.

11. A self-supporting vehicle body as defined in claim 9, wherein said front part further includes longitudinal bearer members below said side walls, a forward cross bearer member supporting thereon said last-mentioned longitudinal bearer members, and a fire wall secured to the rear ends of said last-mentioned longitudinal bearer members.

12. A self-supporting vehicle body as defined in claim 11, wherein said two last-mentioned longitudinal bearer members are provided with upwardly extending off-set portions, and inclined brace members secured to said fire wall and bracing said last-mentioned longitudinal bearer members.

13. A self-supporting vehicle body composed of a plurality of main body parts made of pressed sheet-metal members comprising a floor plate part, a roof part, a front part, a rear part and two lateral wall parts, said floor part having in the forward region thereof angularly bent longitudinal rim portions and within the rear region thereof having longitudinal rim portions of essentially U-shaped profile opened in the lateral direction of said body, said rear part including complementary wall portions completing the rim portions of said U-shaped profile into hollow box-like bearer members, said bearer members each extending essentially to the rearmost part of said body and being bent upwardly within the region of the rear wheel housing, said lateral wall parts including sill portions with an inwardly open U-shaped cross section to thereby complete said longitudinal rim portions of said floor part into box-like longitudinal bearer members essentially constituting continuations of said hollow box-like bearer members formed by portions of said floor part and of said rear part, said rear and front parts each including upwardly extending portions of semi-shell-like cross section cooperating with upwardly extending complementarily shaped portions of said lateral wall parts to form hollow box-like profile bearer members, said complementarily shaped portions being of semi-shell-like cross section and the upwardly extending portions of said rear part including an upper interconnecting section and defining therewith an aperture for the rear window.

14. A self-supporting vehicle body as defined in claim 13, wherein each of the upwardly extending portions of said rear part pass over into a side wall defining the luggage compartment and provided with cut-out portions forming wheel housings.

15. A self-supporting vehicle body having door and window apertures and composed of a plurality of sub-assembled, main body parts made of pressed sheet-metal members comprising a floor plate part, a roof part, a front part, a rear part and two lateral wall parts, said floor part including a floor plate reinforced by pressed configurations thereof and having in at least one of the forward and center regions of said door apertures angularly-bent longitudinal rim portions forming essentially straight web portions, said floor plate also including within the rear region thereof an offset rear portion extending over the entire width thereof to provide freedom of movement for the wheel suspension and having within said rear region along said off-set portion longitudinal rim portions of essentially U-shaped profile opened toward the outside, said rear part including essentially flat wall surfaces completing the rim portions having said U-shaped profile into a hollow box-like bearer member, said lateral wall parts including, within the regions of said door apertures, sill portions having an inwardly open U-shaped cross section completing said longitudinal rim portions of said floor part into box-like longitudinal bearer members, and said rear and front parts each including upwardly extending portions of semi-shell-like cross section cooperating with upwardly extending complementarily shaped portions of said lateral wall parts to form hollow box-like profile bearer members, said complementarily shaped portions being of semi-shell-like cross section.

16. A self-supporting vehicle body composed of a plurality of main body parts made of pressed sheet metal members comprising a floor plate part, a front part, a rear part and two lateral wall parts, said floor part including a reinforced floor plate and having over at least a portion of its length angularly bent longitudinal rim portions having a hat-shaped cross-section with the open side facing downwardly, additional profile means reinforcing said hat-shaped cross-section, and said rear and front parts each including upwardly extending portions cooperating with complementarily shaped portions of said lateral wall parts to form box-like bearer members.

17. A self-supporting vehicle body composed of a plurality of preformed sub-assemblies comprising a floor part, a front part, a rear part and two side walls, said side walls adjacent their lower edges having longitudinally extending semi-shell-like edge portions, said floor part on each lateral side having semi-shell-like portions complementary with the semi-shell-like portions of said side walls, said side walls adjacent their front and rear ends having substantially vertically extending semi-shell-like edge portions, both said front and rear parts having similar semi-shell-like substantially vertically extending edge portions complementary with the vertically extending edge portions of said side walls, all of the above-named complementary pairs of semi-shell-like portions forming in and of themselves substantially hollow box-shaped bearer members, said floor part having further semi-shell-like edge portions of substantially U-shaped profile in vertical section opening laterally of said body and extending to the rearmost part of said body and being curved upwardly in the vicinity of the rear wheel housing of said body, said rear part having edge portions complementary to said edge portions of substantially U-shaped profile to form substantially hollow box-shaped bearer members essentially constituting continuations of bearer members formed by the longitudinally extending semi-shell-like edge portions of said side walls and the complementary edge portions of said floor part.

18. A self-supporting vehicle body as defined in claim 17, further including a roof portion, and laterally extending box-shaped bearer means secured to said side walls adjacent the juncture of said side walls and said roof portion.

References Cited in the file of this patent

UNITED STATES PATENTS

| | | |
|---|---|---|
| 1,838,852 | Ledwinka | Dec. 29, 1931 |
| 2,188,267 | Ledwinka et al. | Jan. 23, 1940 |
| 2,431,524 | Ulrich et al. | Nov. 25, 1947 |
| 2,662,793 | Lindsay | Dec. 15, 1953 |
| 2,677,572 | Pickard | May 4, 1954 |
| 2,733,096 | Waterhouse et al. | Jan. 31, 1956 |
| 2,908,528 | Richter | Oct. 13, 1959 |

FOREIGN PATENTS

| | | |
|---|---|---|
| 469,584 | Italy | Mar. 6, 1952 |
| 1,033,810 | France | Apr. 8, 1953 |